United States Patent
Kido et al.

(10) Patent No.: US 9,564,969 B2
(45) Date of Patent: Feb. 7, 2017

(54) LIGHTING FIXTURE FOR VISIBLE LIGHT COMMUNICATION AND VISIBLE-LIGHT-COMMUNICATION SYSTEM WITH SAME

(71) Applicant: Panasonic Corporation, Osaka (JP)

(72) Inventors: Shojirou Kido, Osaka (JP); Eiji Shiohama, Osaka (JP)

(73) Assignee: Panasonic Iintellectual Property Management Co., Ltd., Osaka (JP)

( * ) Notice: Subject to any disclaimer, the term of this patent is extended or adjusted under 35 U.S.C. 154(b) by 57 days.

(21) Appl. No.: 14/356,476

(22) PCT Filed: Nov. 5, 2012

(86) PCT No.: PCT/JP2012/078609
§ 371 (c)(1),
(2) Date: May 6, 2014

(87) PCT Pub. No.: WO2013/077174
PCT Pub. Date: May 30, 2013

(65) Prior Publication Data
US 2014/0334826 A1   Nov. 13, 2014

(30) Foreign Application Priority Data
Nov. 22, 2011   (JP) ................... 2011-254942

(51) Int. Cl.
*H04B 10/116*   (2013.01)
*H05B 33/08*    (2006.01)

(52) U.S. Cl.
CPC ......... *H04B 10/116* (2013.01); *H05B 33/0818* (2013.01)

(58) Field of Classification Search
CPC .... Y02B 20/346; F21L 4/027; F21Y 2101/02; H04N 5/2252; H05B 33/0803; H05B 33/0809; H05B 33/0815; H05B 33/0818; H05B 33/0845; H05B 33/0863; H05B 33/0869; H05B 37/02; H05B 37/0245; H05B 39/086
(Continued)

(56) References Cited

U.S. PATENT DOCUMENTS

| 6,574,081 B1 * | 6/2003 | Matsumoto et al. ........... 361/18 |
| 2008/0265799 A1 * | 10/2008 | Sibert ............... H05B 37/0245 315/292 |

(Continued)

FOREIGN PATENT DOCUMENTS

| JP | 2004-120101 A | 4/2004 |
| JP | 2007-149344 A | 6/2007 |

(Continued)

OTHER PUBLICATIONS

International Search Report for corresponding International Application No. PCT/JP2012/078609 mailed Dec. 4, 2012.
(Continued)

*Primary Examiner* — Douglas W Owens
*Assistant Examiner* — Wei Chan
(74) *Attorney, Agent, or Firm* — Renner, Otto, Boisselle & Sklar, LLP.

(57) ABSTRACT

A lighting fixture for visible light communication is configured to modulate light intensity of a light source (11) comprising a light-emitting device (2) to superpose a communication signal on illumination light. The lighting fixture includes: a power supply circuit (3) configured to control light output of the light source (11) based on a dimming signal; a switch device (Q1) for modulating an output current from the power supply circuit (3) to the light source (11); an impedance element (Rx); a communication circuit (4); and an ON circuit (6). The communication circuit (4) is
(Continued)

configured to supply a modulation signal to a side of the switch device (Q1) to superpose the communication signal on the illumination light. The ON circuit (6) is configured to turn on the switch device (Q1) by supply power from the power supply circuit (3) when the communication circuit (4) is inactivated.

16 Claims, 6 Drawing Sheets

(58) Field of Classification Search
USPC ........... 398/201; 315/35, 308, 291, 273, 297
See application file for complete search history.

(56) References Cited

U.S. PATENT DOCUMENTS

| | | | |
|---|---|---|---|
| 2009/0039787 A1* | 2/2009 | Oh | 315/35 |
| 2009/0160349 A1* | 6/2009 | Weger | 315/246 |
| 2010/0072898 A1* | 3/2010 | Ohashi | H05B 33/0845 315/127 |
| 2011/0080112 A1* | 4/2011 | Shearer et al. | 315/291 |
| 2012/0032612 A1* | 2/2012 | Antony | H05B 33/089 315/297 |
| 2012/0051757 A1* | 3/2012 | Nishino et al. | 398/201 |

FOREIGN PATENT DOCUMENTS

| | | |
|---|---|---|
| JP | 2007-251864 A | 9/2007 |
| JP | 2008-048205 A | 2/2008 |
| JP | 2008-066828 A | 3/2008 |
| JP | 2009-005192 A | 1/2009 |
| JP | 2010-283616 A | 12/2010 |
| JP | 2011-034713 A | 2/2011 |
| JP | 2012-010269 A | 1/2012 |
| JP | 2012-069505 A | 4/2012 |
| JP | 2012-134691 A | 7/2012 |

OTHER PUBLICATIONS

Form PCT/ISA/237 for corresponding International Application No. PCT/JP2012/078609 dated Dec. 4, 2012.

* cited by examiner

US 9,564,969 B2

LIGHTING FIXTURE FOR VISIBLE LIGHT COMMUNICATION AND VISIBLE-LIGHT-COMMUNICATION SYSTEM WITH SAME

TECHNICAL FIELD

The invention relates to a lighting fixture for visible light communication, configured to modulate light intensity of a light source to superpose a communication signal on illumination light of the light source, and a visible-light-communication system with the same.

BACKGROUND ART

Japanese Patent Application Publication No. 2011-34713 (hereinafter referred to as a "Document 1") discloses a lighting fixture equipped with a visible-light-communication function that transmits a communication signal by using illumination light. The lighting fixture includes: a light source substrate on which a light source is mounted; a lighting circuit substrate which is electrically connected with the light source substrate and performs lighting control of the light source; and a visible-light-communication controlling substrate which superposes a communication signal on outgoing light from the light source. In the lighting fixture, the visible-light-communication controlling substrate is detachably disposed between the lighting circuit substrate and the light source substrate, and a design thereof can be accordingly made common between a device with a visible-light-communication function and a device with no visible-light-communication function. Control electrical power of the visible-light-communication controlling substrate is supplied from an output terminal of the lighting circuit substrate.

However, when a switch device for modulation in the visible-light-communication controlling substrate is turned off, a load voltage onto light-emitting devices (LEDs) in the light source is shut off, and accordingly the lighting fixture of Document 1 is put in a condition without substantial load with respect to the light source. A PFC circuit having a boost function for improving distortion of an input electric current is used for a general power supply circuit of which electric power supply is commercial power AC, and accordingly if the light source is put in the unloaded condition, a voltage across the output terminals of the power supply circuit rises close to output voltage of the PFC circuit. If the voltage across the output terminals of the power supply circuit rises, an input voltage onto a control power supply of the visible-light-communication controlling substrate rises as well, which causes loss of circuit. Therefore, the circuit configuration can be considered in which a resistor for modulation is provided in parallel to a switch device for modulation, for modulating an output current supplied from the power supply circuit to the light source, thereby preventing unloaded condition of the light source even when the switch device for modulation is turned off.

However, in this circuit configuration, the power supply circuit performs constant current control, and accordingly when the switch device for modulation starts an ON operation, an electric current flows through a side of the switch device for modulation, thereby short-circuiting two ends of the resistor for modulation. At this time, as shown in FIG. 8, an output voltage onto the light source slightly decreases, whereas impedance between output ends of the power supply circuit decreases sharply. Accordingly, a surge current is included in an output current to the light source and an excessive current stress instantaneously flows through LEDs of the light source. A maximum rated current of an LED is set to about twice of a rated current in general, but may be set to be lower than that. There is a concern that LEDs suffer damage if the aforementioned surge current generates. If a resistance value of a resistor for modulation is decreased, the occurrence of a surge current can be suppressed. However, this instance causes decrease of a modulation width (modulation ratio) by ON and OFF of a switch device for modulation, which is undesirable for a visible light communication.

SUMMARY OF INVENTION

It is an object of the present invention to stabilize a power supply voltage of a power supply circuit and also to suppress the occurrence of a surge current when a switch device for modulation starts an ON operation to reduce a current stress onto a light source.

The present invention is a lighting fixture for visible light communication, configured to modulate light intensity of a light source (11) comprising a light-emitting device (2) to superpose a communication signal on illumination light of the light source (11). The invention also comprises a power supply circuit (3), a switch device (Q1), an impedance element (Rx), a communication circuit (4) and an ON circuit (6). The power supply circuit (3) is configured to control a load current flowing through the light source (11) based on a dimming signal to control light output of the light source (11). The switch device (Q1) is configured to modulate an output current supplied from the power supply circuit (3) to the light source (11). The impedance element (Rx) is connected in parallel with the switch device (Q1). The communication circuit (4) is configured to supply a side of the switch device (Q1) with a modulation signal for superposing the communication signal on the illumination light from the light source (11) to turn the switch device on and off. The ON circuit (6) is configured to turn the switch device (Q1) on by supply power from the power supply circuit (3) when the communication circuit (4) is inactivated.

In an embodiment, the lighting fixture for visible light communication further comprises a control power supply (5) configured to supply electric power to the communication circuit (4). One end of two input ends of the control power supply (5) is connected to one end of the impedance element (Rx).

In an embodiment, the lighting fixture for visible light communication further comprises a photo-coupler (PC) connected to a control terminal of the switch device (Q1). The communication circuit (4) is configured to transmit the modulation signal to the control terminal of the switch device (Q1) through the photo-coupler (PC).

In an embodiment, the lighting fixture for visible light communication further comprises a protective circuit (7) comprising a switch device (Q71) connected in parallel with the impedance element (Rx). The protective circuit (7) is configured to divert an electric current toward the impedance element (Rx) when a voltage across the impedance element (Rx) increases to a predetermined value.

A visible-light-communication system of the present invention comprises: the aforementioned lighting fixture for visible light communication; and a receiver (40) configured to receive a communication signal transmitted from the lighting fixture for visible light communication.

In the present invention, since the impedance element (Rx) connected in parallel with the switch device (Q1) is provided, the light source (11) is not put in an unloaded condition. It is therefore possible to stabilize a power supply voltage of the power supply circuit (3). An ON signal continues to flow to the control terminal of the switch device (Q1) from the ON circuit (6), and accordingly impedance between output ends of the power supply circuit (3) does not decrease sharply when the communication circuit (4) starts an ON operation. It is therefore possible to suppress the occurrence of a surge current and to reduce a current stress onto the light source (11).

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS

Figure 1A:
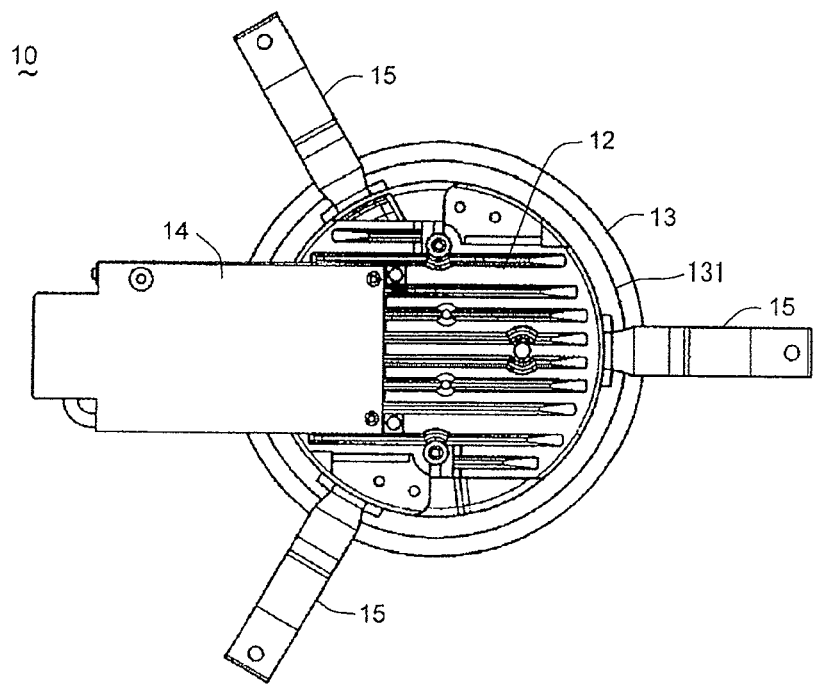
FIGS. 1A, 1B and 1C are a top view, a lateral view and a bottom view of a lighting-fixture body of a lighting fixture for visible light communication in accordance with a first embodiment of the present invention, respectively.
Figure 1B:
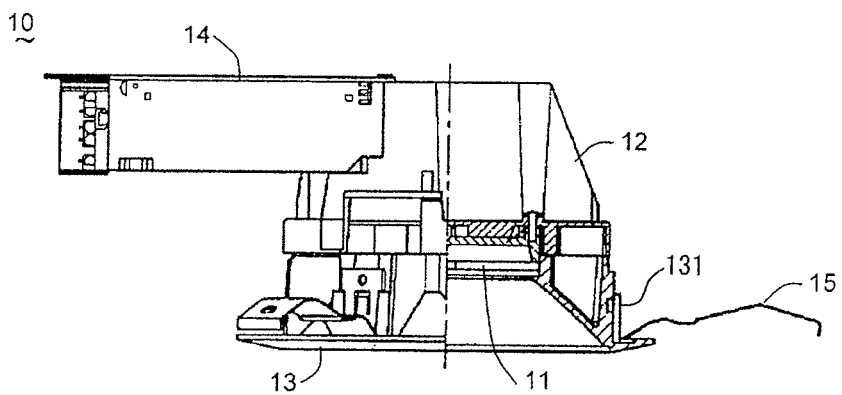
Figure 1C:
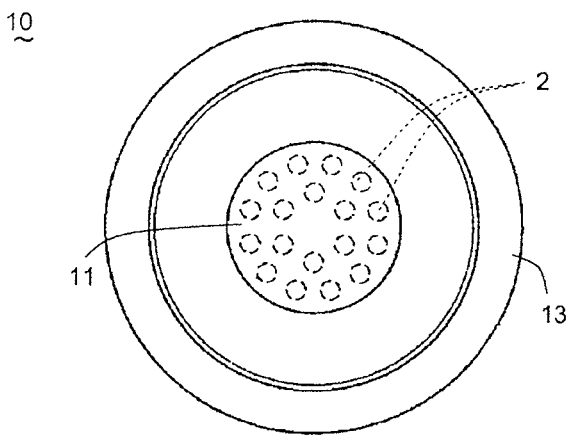

A lighting fixture for visible light communication in accordance with a first embodiment of the present invention is explained with reference to FIGS. 1A-4. FIGS. 1A and 1B show a downlight recessed in a ceiling or the like as a configuration example of the lighting fixture for visible light communication (hereinafter referred to as a "lighting fixture 10") in the embodiment. The lighting fixture 10 includes a light source 11, a body 12, a flange frame 13, a terminal block 14 and fixing springs 15. The light source 11 includes light-emitting devices mounted on a circuit board, each of which is, for example, a light-emitting diode (an LED) 2. The body 12 houses a lighting circuit 1 configured to turn on, turn off and dim the LEDs 2 of the light source 11 (see FIG. 2 to be described). The flange frame 13 includes a cylindrical portion 131 extended upward from an inner peripheral edge thereof, and is configured to fix the body 12 housing the light source 11 or the like to a ceiling or the like by fitting the cylindrical portion 131 into a hole cut in the ceiling or the like. The terminal block 14 is connected with power wires to receive power supply from a commercial power supply AC. The fixing springs 15 are used for fixing the flange frame 13 to the ceiling or the like.

Figure 2:
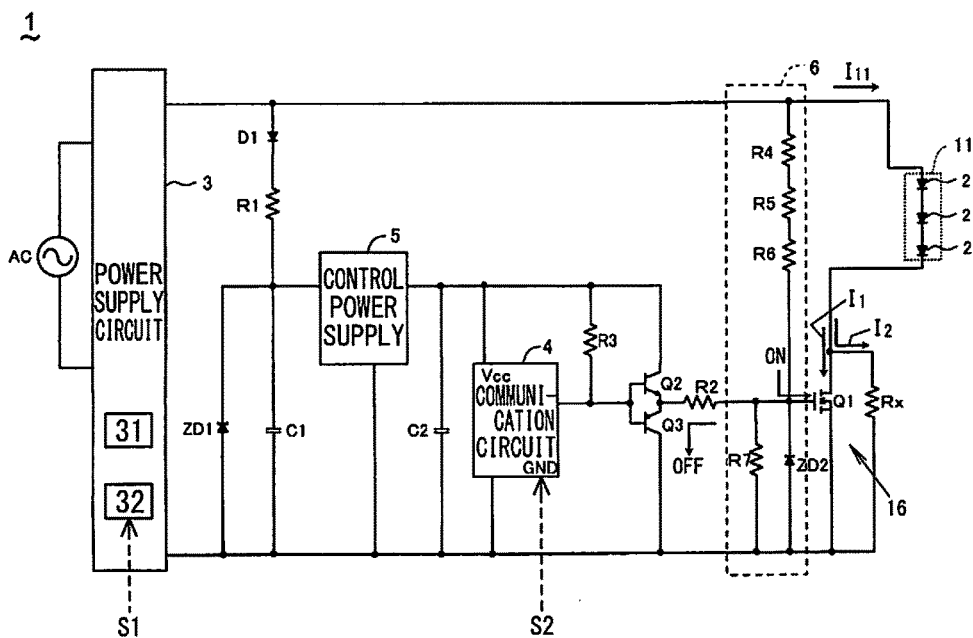
FIG. 2 is a circuit diagram of a lighting circuit used for the lighting fixture for visible light communication.

FIG. 2 shows a circuit configuration of a lighting circuit 1 configured to control a load current flowing through the light source 11 comprising the LEDs 2 based on a dimming signal to turn on, turn off and dim the light source 11. The lighting circuit 1 includes a power supply circuit 3, a communication circuit 4 and a control power supply 5. The power supply circuit 3 is configured to control a load current flowing through the light source 11 based on a control signal, i.e., an ON signal, an OFF signal or a dimming signal. For example, the power supply circuit 3 includes: an AC/DC converter 31 configured to convert AC electric power from a commercial power supply AC into DC electric power; and an output controller 32 configured to control the AC/DC converter 31 to adjust a load current to the light source 11. The communication circuit 4 is a circuit forming a visible-light-communication circuit (a VLC circuit), and is configured to supply a side of a switch device for modulation (Q1) with a modulation signal for superposing a communication signal on illumination light of the light source 11. The control power supply 5 is configured to supply electric power to the communication circuit 4. In the example of FIG. 2, an input part of the control power supply 5 is connected between output ends of the power supply circuit 3 via a series circuit of a rectifier diode (D1) and a resistor (R1), and also connected in parallel with a parallel circuit of a capacitor (C1) and a zener diode (ZD1) for voltage stabilization. A smoothing capacitor (C2) is disposed between an output part of the control power supply 5 and the communication circuit 4, and is connected in parallel with the output part of the control power supply 5 and connected in parallel with an input part of the communication circuit 4.

The lighting circuit 1 also includes an impedance element (Rx) that is a resistor for modulation connected in series with the light source 11, and a switch device for modulation (Q1) for modulating an output current supplied from the power supply circuit 3 to light source 11. For example, an nMOS-FET is used for the switch device (Q1). The resistor (Rx) is connected in parallel with the switch device (Q1). In short, the impedance element (Rx) and the switch device (Q1) are connected in parallel with each other, and a parallel circuit of Rx and Q1 is connected in series with the light source 11. A combination circuit of Rx, Q1 and the light source 11 is connected between two output ends of the power supply circuit 3. Specifically, two ends (first and second ends) of the resistor (Rx) are connected to two ends (first and second ends) of the switch device (Q1), respectively, and the first ends of the resistor (Rx) and the switch device (Q1) are connected to a first end of the power supply circuit 3 via the light source 11, while the second ends of the resistor (Rx) and the switch device (Q1) are connected to a second end of the power supply circuit 3. In the example of FIG. 2, the control power supply 5 is a 3-Terminal regulator, and has two input ends (first and second input ends) and two output ends (first and second output ends), and the second input end and the second output end function as a common terminal. That is, one end (the second end) of the resistor (Rx) is connected to one end (the common terminal) of input ends of the control power supply 5 for supplying a control voltage (a gate voltage) to a control terminal (a gate terminal) of the switch device (Q1).

The lighting circuit 1 further includes an ON circuit 6 for turning the switch device (Q1) on by supply power from the power supply circuit 3 when the communication circuit 4 is inactivated. The ON circuit 6 is connected between the communication circuit 4 and the gate of the switch device (Q1) via transistors (Q2 and Q3) functioning as an inverter and a resistor (R2). The path is provided with a resistor (R3) for adjusting a load voltage from the control power supply 5. The ON circuit 6 includes resistors (R4-R6) connected in parallel with the light source 11, and a zener diode (ZD2) and a resistor (R7) for voltage stabilization and voltage adjustment. Specifically, a series circuit of the resistors (R4-R6) is connected between the first output end of the power supply circuit 3 and the control terminal of the switch device (Q1), and a parallel circuit of the zener diode (ZD2) and the resistor (R7) is connected between the control terminal of the switch device (Q1) and the second output terminal of the power supply circuit 3. The resistors (R4-R6) are appropriately selected so that a voltage for turning the switch device (Q1) on, which is approximately cancelled by an OFF voltage output from the communication circuit 4, is added to the ON circuit 6.

LEDs employed as the LEDs 2 of the light source 11 are LEDs for emitting illumination light having a specified light color from the lighting fixture 10, for example, white LEDs in each of which a GaN blue LED chip is covered with YAG yellow phosphor so that a white light is emitted by mixing a blue light and an yellow light. However, the LEDs 2 are not limited to the white LEDs. LEDs having different light colors such as red, green and green may be combined arbitrarily. Alternatively, OLEDs each of which is formed of organic light emitting material may be employed as the light source.

Figure 3A:
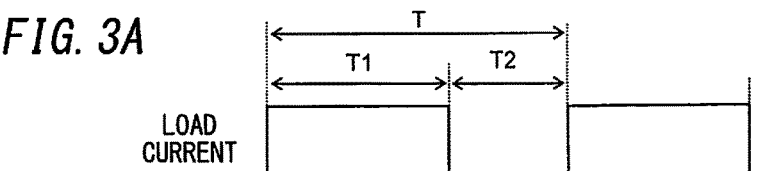
FIGS. 3A-3C illustrate operating waveforms of a load current of a light source in the lighting fixture for visible light communication and a modulation signal superposed on the load current.

The output controller 32 of the power supply circuit 3 is formed of a general-purpose microcomputer and the like, and configured to control light output of the light source 11 by PWM control by switching a switch device in the AC/DC converter 31 based on a control signal S1 transmitted from an external device 8 configured to input dimming operation such as a remote control unit or the like, especially a dimming signal. That is, as shown in FIG. 3A, the output controller 32 is configured to alternately repeat a period (an ON period T1) during which a load current flows through the light source 11 and a period (an OFF period T2) during which a load current does not flow through the light source 11. The output controller 32 is also configured to perform dimming control of the light source 11 by adjusting a ratio (an ON duty ratio) of the ON period (T1) to a period (T) which is a sum of the ON period (T1) and the OFF period (T2) in response to a dimming signal. The PWM control is an example of dimming control mainly during non-communication, and a modulation signal may be superposed on a dimming control signal different from the aforementioned dimming signal shown in FIG. 3A during visible light communication to be described.

Figure 3B:
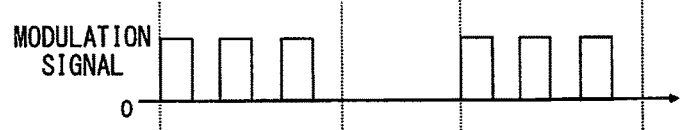

The communication circuit 4 is formed of a general-purpose microcomputer and the like, and configured: to generate a modulation signal to be superposed on illumination light by modulating light intensity of the light source 11 in response to a binary information signal S2 transmitted from the outside of the lighting fixture 10 as shown in FIG. 3B; and to supply the modulation signal to a control terminal side of the switch device (Q1). A frequency of the modulation signal is set to at least a frequency higher than a dimming signal so that waveforms are included in one period of the dimming signal. The control power supply 5 includes a DC/DC converter, and is configured to convert a direct-current voltage from the power supply circuit 3 into a direct-current voltage having a prescribed voltage value suitable for the communication circuit 4.

Figure 3C:
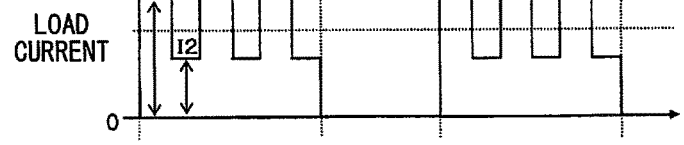

In this configuration, the communication circuit 4 is configured: to receive power supply from the control power supply 5; and to perform changeover for connecting and disconnecting the resistor (Rx) to the light source 11 by controlling ON and OFF of the switch device (Q1) based on the prescribed communication signal. For details, when the switch device (Q1) is turned on, a load current (I1) flows through the light source 11 not via the resistor (Rx). On the other hand, when the switch device (Q1) is turned off, a load current (I2) flows through the light source 11 via the resistor (Rx). Therefore, as shown in FIG. 3C, a current value of the load current (I1) when the switch device (Q1) is turned on is larger than a current value of the load current (I2) when the switch device (Q1) is turned off. Thus, it is possible to modulate light intensity of the light source 11 to superpose a communication signal on illumination light of the light source 11 by changing an amount of a load current flowing through the light source 11.

When the switch device (Q1) is turned off, a load voltage from the power supply circuit 3 to the light source 11 is not shut off owing to the resistor (Rx) connected in parallel with the switch device (Q1). Therefore, the light source 11 is not put in an unloaded condition in the lighting circuit 1, and a power supply voltage of the power supply circuit 3 also does not rise. The input of the control power supply 5 is connected between the two output ends of the power supply circuit 3, and accordingly a stable input voltage can be supplied to the control power supply (5). It is therefore possible to stabilize a power supply voltage of the power supply circuit 3 and an input voltage to the control power supply 5 and also to reduce a loss of circuit. In addition, not high-priced parts having high pressure resistance or many parts but inexpensive general-purpose circuit components can be used for the power supply circuit 3 and the control power supply 5. Moreover, the circuit design is simple, and it is accordingly possible to realize low-cost and miniaturization of the lighting circuit 1 and the lighting fixture 10 with the same.

Figure 4:
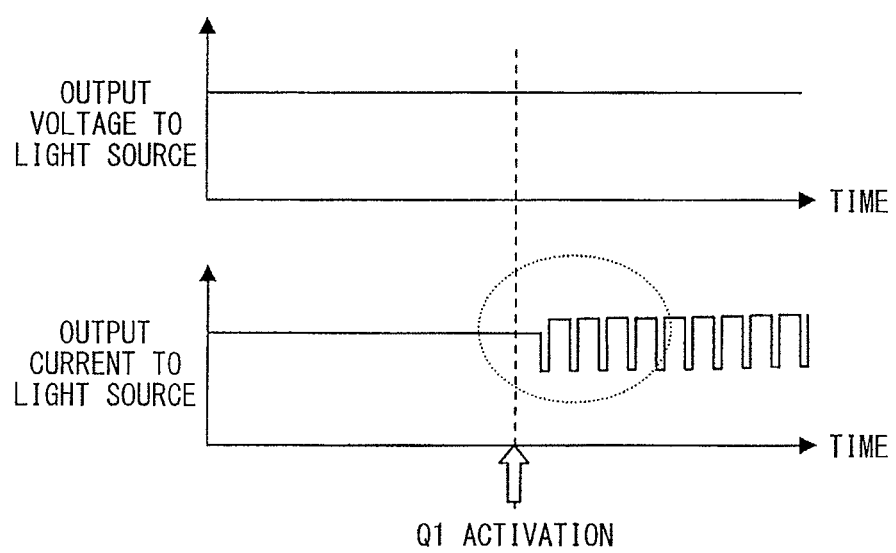
FIG. 4 illustrates operating waveforms of an output voltage variation and an output current variation to the light source in the lighting fixture for visible light communication.

Even when the microcomputer of the communication circuit 4 is inactivated and no electric power is supplied from the control power supply 5 to the switch device (Q1), an ON signal (ON of FIG. 2) is always supplied from the power supply circuit 3 to the gate of the switch device (Q1) through the ON circuit 6. That is, even when the microcomputer of the communication circuit 4 is inactivated, the switch device (Q1) is kept ON and an electric current flows through the light source 11 via not the resistor (Rx) but the switch device (Q1). Therefore, as shown in FIG. 4, even if the microcomputer of the communication circuit 4 is activated and starts output of an ON signal from the control power supply 5 via the transistor (Q2), impedance between the output ends of the power supply circuit 3 does not change and a surge current does not occur in an output current to the light source 11. When the microcomputer of the communication circuit 4 is activated and outputs an OFF signal, an electric current returning toward the transistor (Q3) from the ON circuit 6 (OFF of FIG. 2) occurs and accordingly an ON signal to the gate of the switch device (Q1) through the ON circuit 6 is cancelled. As a result, the switch device (Q1) is turned off, and a load current (I2) flows through the resistor (Rx). Therefore, in the aforementioned configuration, it is possible to stabilize a power supply voltage of the power supply circuit 3 and to suppress the occurrence of a surge current when the switch device (Q1) starts an ON operation, thereby reducing current stress onto the light source 11.

Figure 5:
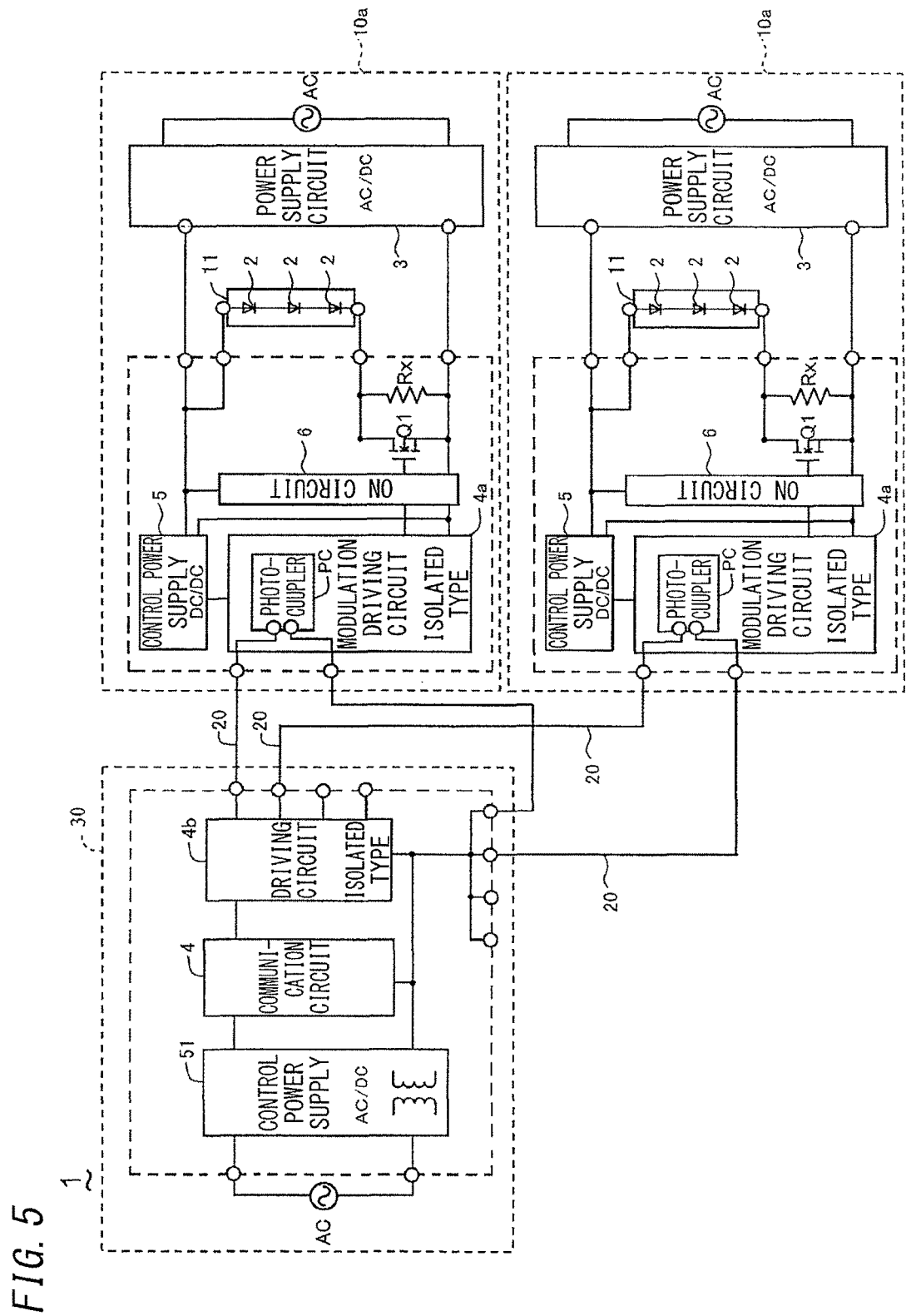
FIG. 5 is a circuit diagram of a lighting circuit used for a lighting fixture for visible light communication in accordance with a second embodiment of the present invention.

A lighting fixture for visible light communication in accordance with a second embodiment of the present invention is explained with reference to FIG. 5. FIG. 5 is a circuit configuration showing a lighting circuit 1 of a lighting fixture 10 in the present embodiment. The lighting fixture 10 includes: a plurality of lighting-fixture bodies 10a; and a transmitter 30 as a function for outputting a visible-light-communication signal, which is disposed outside the lighting-fixture bodies 10a. The transmitter 30 is provided with a communication circuit 4. Each lighting-fixture body 10a has a configuration similar to the lighting fixture 10 in the first embodiment except for the communication circuit 4. In the illustrated example, two lighting-fixture bodies 10a are provided, but the lighting fixture for visible light communication may include two or more lighting-fixture bodies 10a. In FIG. 5, the lighting fixture for visible light communication can include four lighting-fixture bodies 10a. Each lighting-fixture body 10a is connected to the transmitter 30 through its own two signal wires 20. Each lighting-fixture body 10a includes a modulation-signal driving circuit (hereinafter referred to as a "modulation circuit") 4a connected to a control terminal (a gate) of a switch device (Q1) via an ON circuit 6, and the modulation circuit 4a is connected to signal wires 20 via a photo-coupler (PC). The transmitter 30 includes a control power supply 51 configured to supply electric power to the communication circuit 4. The communication circuit 4 of the transmitter 30 is connected to the signal wires 20 via a photo-coupler driving circuit (hereinafter referred to as a "driving circuit") 4b. The modulation circuit 4a and the driving circuit 4b are employed as circuits for electrical isolation.

In the configuration, illumination lights from the plurality of lighting-fixture bodies 10a used for the lighting fixture 10 are modulated based on a modulation signal transmitted from the transmitter 30. Accordingly, the communication signals superposed on the illumination lights are synchronized, and signal interference can be prevented. That is, suppose each lighting-fixture body 10a to be a slave, the transmitter 30 functions as a master for synchronization and modulation of the slaves while synchronizing them, and the master controls a communication signal for the slaves.

A fine current by which a light-emitting diode in a photo-coupler (PC) is driven just flows through signal wires 20 connecting the transmitter 30 and each lighting-fixture body 10a, and a large current for, e.g., modulation dimming of each lighting-fixture body 10a does not flow therethrough. As a result, radiation noise can be reduced. Since the lighting-fixture bodies 10a are provided with respective photo-couplers (PC), a circuit configuration of each modulation circuit 4a that requires isolation can be simplified, and the visible-light-communication system can be easily applied to existing non-isolated lighting fixtures. Therefore, the lighting fixture 10 can prevent interference of communication signals superposed on illumination lights and noise occurrence to correctly transmit the communication signal, and isolation in transmission place of a communication signal can be easily secured.

Figure 6:
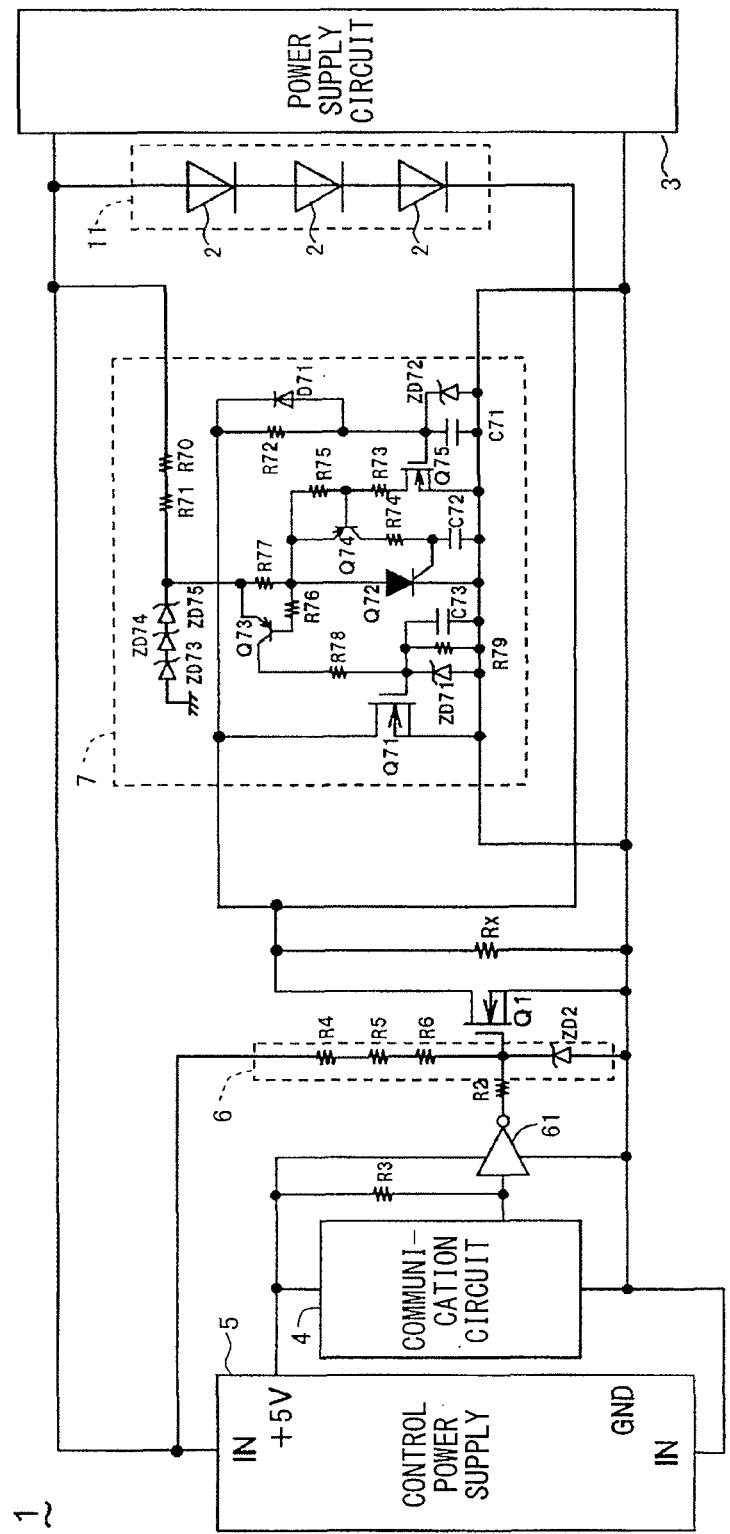
FIG. 6 is a circuit diagram of a lighting circuit used for a lighting fixture for visible light communication in accordance with a third embodiment of the present invention.

A lighting fixture for visible light communication in accordance with a third embodiment of the present invention is explained with reference to FIG. 6. FIG. 6 is a circuit configuration showing a lighting circuit 1 of a lighting fixture 10 in the present embodiment. The lighting circuit 1 includes a protective circuit 7 that includes a switch device (Q71) for protection (diversion), connected in parallel with a resistor (Rx). In the illustrated example, a switch device between a communication circuit 4 and a control terminal of a switch device (Q1) represents an inverter 61. Other configuration is similar to the first embodiment.

Even when the communication circuit 4 is activated, the switch device (Q1) may be OFF state owing to failure or the like in a microcomputer of the communication circuit 4 or the inverter 61 connecting the communication circuit 4 and the switch device (Q1). At this time, an electric current intermittently flows through the resistor (Rx) and an output voltage of a power supply circuit 3 abnormally rises. Therefore, in the present embodiment, when a voltage across the resistor (Rx) increase and reaches a predetermined voltage, an electric current toward the resistor (Rx) is diverted by the protective circuit 7.

The protective circuit 7 includes: the switch device (Q71) for diversion for diverting an electric current toward the resistor (Rx); a thyristor (Q72) provided on a path for an ON current to a control terminal (a gate) of the switch device (Q71) flows; transistors (Q73 and Q74); and a switch device (Q75). The protective circuit 7 is also provided with: capacitors (C71-C73) and zerner diodes (ZD71, ZD72) for setting a gate voltage or a base current of each of the switch devices, and various resistors (R72-R79) for adjusting electric potential in each element. Resistors (R70 and R71) and zener diodes (ZD73-ZD75) connected to ground are disposed between one end of two input ends of the protective circuit 7 and ground.

An operation of the protective circuit 7 is explained. If a load current continues to flow through each LED 2 of a light source 11 while the switch device (Q1) is kept turned off, a voltage across the resistor (Rx) increases. When the voltage across the resistor (Rx) reaches or exceeds a gate threshold voltage of the switch device (MOSFET) (Q75), which is set through the zener diode (ZD72), the switch device (Q75) starts an ON operation. At this time, the transistor (Q74) conducts and the capacitor (C72) is charged, so that the thyristor (Q72) is also turned on along with the operation of the switch device (Q75). As a result, a path through which a base current of the transistor (Q73) flows is made, and an ON current with respect to a gate of the switch device (Q71) flows via resistors (R78 and R79). Thus, the switch device (Q71) is turned on, and thereby an electric current toward the resistor (Rx) can be diverted by the protective circuit 7.

The ON state of the switch device (Q1) continues until a gate voltage of the switch device (Q71) becomes lower than the threshold voltage after the output of the power supply circuit 3 is turned off at once, the voltage thereof decreases and the thyristor (Q72) is turned off. That is, the protective circuit 7 is configured so that the switch device (Q1) is not turned off as long as a voltage from the power supply circuit 3 is not shut down by resetting a power supply of the lighting fixture 10. In the configuration provided with the protective circuit 7, when the switch device (Q1) is kept turned off, an electric current to flow through the resistor (Rx) is diverted, thereby preventing an output voltage of the power supply circuit 3 from abnormally rising to protect the lighting circuit 1.

Figure 7A:
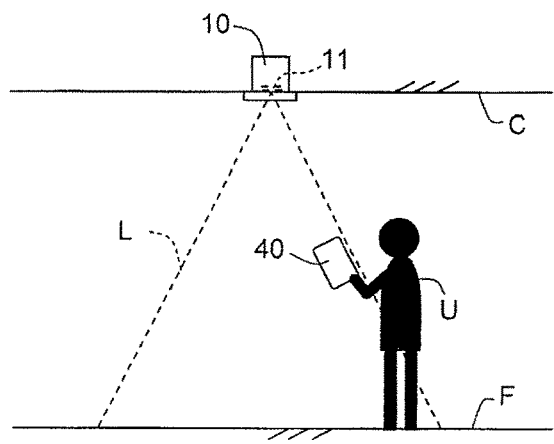
FIG. 7A is a lateral view of a visible-light-communication system with the lighting fixture for visible light communication.

A configuration example of a visible-light-communication system with a lighting fixture 10 as shown in the aforementioned embodiments is explained with reference to FIGS. 7A and 7B. The visible light communication system includes a lighting fixture 10 as described above, and a receiver 40 configured to receive a communication signal transmitted from the lighting fixture 10. As shown in FIG. 7A, the lighting fixture 10 is recessed in a ceiling (C), and illumination light (L) is emitted from the light source 11 in a predetermined range in a direction toward a floor (F).

Figure 7B:
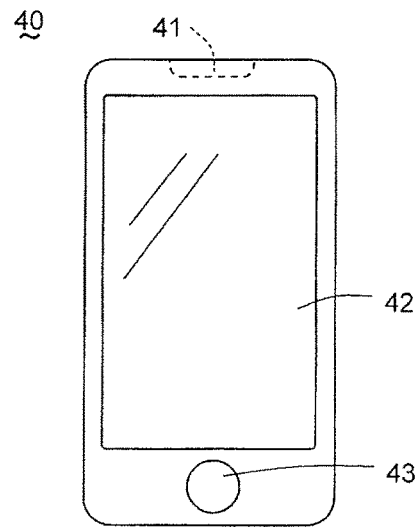
FIG. 7B is a front view of a receiver in the system.
Figure 8:
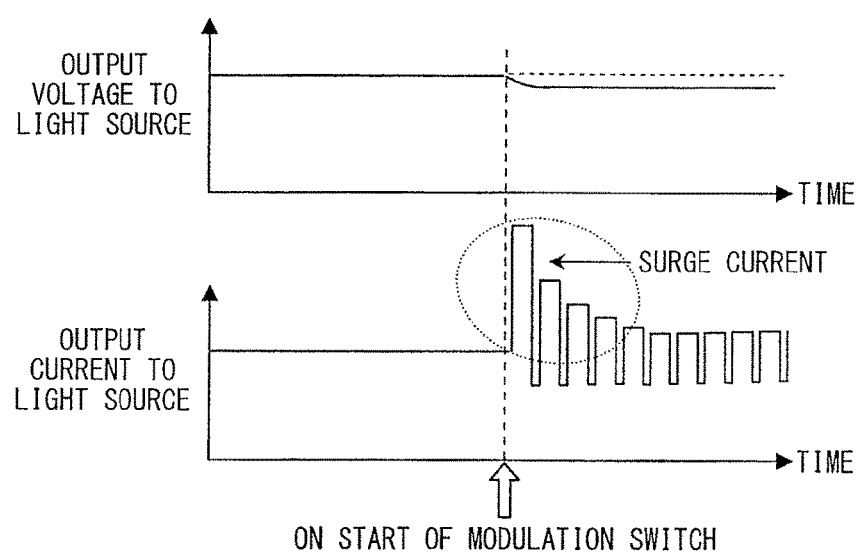
FIG. 8 illustrates operating waveforms of an output voltage variation and an output current variation to a light source in a lighting fixture for visible light communication compared with the present invention.

The receiver 40 is formed of, for example, a portable terminal as shown in FIG. 7B, and includes a light receive part 41 formed of a photodiode and the like, for receiving the illumination light emitted from the lighting fixture 10. For example, the receiver 40 also includes: a display part 42 formed of a liquid-crystal display or the like; an operation part 43; and a signal processing circuit (not shown) configured to receive light through the light receive part 41 to read a communication signal based on light intensity of the illumination light (L). If a display having a touch panel function is employed as the display part 42, the function of the operation part 43 can be realized in the display part 42. The light receive part 41 may be a camera formed of a CMOS sensor. That is, a general portable telephone installed with a signal processing software for reading the communication signal may be employed as the receiver 40. However, the receiver 40 is not limited to the aforementioned portable terminals. It may be a receiver having another construction.

In the present configuration, as shown in FIG. 7A, if a user (U) uses the receiver 40, it is possible to receive a communication signal superposed on illumination light from the lighting fixture 10 in the illumination range of the lighting fixture 10. The communication signal includes location information, image information, speech information and the like, and the user (U) can obtain information included in the communication signal by displaying the information on the display part 42 or the like through the receiver 40.

The invention is not limited to the aforementioned embodiments. Various modifications can be applied to the invention. For example, the control power supply 5 may be provided with a backup power supply (not shown) formed of: a secondary battery; and a charging circuit for charging the secondary battery by the output of the AC/DC converter 31. In addition to the resistor (Rx), an LED(s) may be employed as the impedance element. If the LED(s) is lit by, e.g., electric power supplied from the backup power supply, the LED(s) can be made to function as an auxiliary light source when a commercial power supply AC is cut off due to the occurrence of blackout caused by a disaster or the like.

Although the present invention has been described with reference to certain preferred embodiments, numerous modifications and variations can be made by those skilled in the art without departing from the true spirit and scope of this invention, namely claims.

The invention claimed is:

1. A lighting fixture for visible light communication, comprising:
   a power supply circuit configured to control a load current flowing through a light source based on a dimming signal, thereby controlling light output of the light source;
   a switch device and an impedance element that are connected in parallel with each other, a parallel circuit of which is connected in series with the light source so that when the switch device is turned off, a load current flows through the light source via the impedance element and so that when the switch device is turned on, the load current flows through the light source via the switch device;
   a communication circuit configured:
      to generate a modulation signal to be superposed on illumination light of the light source by modulating light intensity of the light source in response to a binary information signal transmitted from an outside of the lighting fixture, the binary information signal being different from the dimming signal and
      to supply the modulation signal to a side of the switch device, thereby turning the switch device on and off; and
   an ON circuit configured to turn the switch device on by supply power from the power supply circuit when the communication circuit is inactivated.

2. The lighting fixture for visible light communication of claim 1, further comprising a control power supply configured to supply electric power to the communication circuit,
   wherein one end of two input ends of the control power supply is connected to one end of the impedance element.

3. The lighting fixture for visible light communication of claim 1, further comprising a photo-coupler connected to a control terminal of the switch device,
   wherein the communication circuit is configured to transmit the modulation signal to the control terminal of the switch device through the photo-coupler.

4. The lighting fixture for visible light communication of claim 1, further comprising a protective circuit comprising a switch device connected in parallel with the impedance element,
   wherein the protective circuit is configured to divert an electric current toward the impedance element when a voltage across the impedance element increases to a predetermined value.

5. A visible-light-communication system, comprising:
   a lighting fixture for visible light communication of claim 1; and
   a receiver configured to receive a communication signal transmitted from the lighting fixture for visible light communication.

6. The lighting fixture for visible light communication of claim 2, further comprising a photo-coupler connected to a control terminal of the switch device,
   wherein the communication circuit is configured to transmit the modulation signal to the control terminal of the switch device through the photo-coupler.

7. The lighting fixture for visible light communication of claim 2, further comprising a protective circuit comprising a switch device connected in parallel with the impedance element,
   wherein the protective circuit is configured to divert an electric current toward the impedance element when a voltage across the impedance element increases to a predetermined value.

8. The lighting fixture for visible light communication of claim 3, further comprising a protective circuit comprising a switch device connected in parallel with the impedance element,
   wherein the protective circuit is configured to divert an electric current toward the impedance element when a voltage across the impedance element increases to a predetermined value.

9. The lighting fixture for visible light communication of claim 6, further comprising a protective circuit comprising a switch device connected in parallel with the impedance element,
   wherein the protective circuit is configured to divert an electric current toward the impedance element when a voltage across the impedance element increases to a predetermined value.

10. A visible-light-communication system, comprising:
   a lighting fixture for visible light communication of claim 2; and
   a receiver configured to receive a communication signal transmitted from the lighting fixture for visible light communication.

11. A visible-light-communication system, comprising:
a lighting fixture for visible light communication of claim 3; and
a receiver configured to receive a communication signal transmitted from the lighting fixture for visible light communication.

12. A visible-light-communication system, comprising:
a lighting fixture for visible light communication of claim 4; and
a receiver configured to receive a communication signal transmitted from the lighting fixture for visible light communication.

13. A visible-light-communication system, comprising:
a lighting fixture for visible light communication of claim 6; and
a receiver configured to receive a communication signal transmitted from the lighting fixture for visible light communication.

14. A visible-light-communication system, comprising:
a lighting fixture for visible light communication of claim 7; and
a receiver configured to receive a communication signal transmitted from the lighting fixture for visible light communication.

15. A visible-light-communication system, comprising:
a lighting fixture for visible light communication of claim 8; and
a receiver configured to receive a communication signal transmitted from the lighting fixture for visible light communication.

16. A visible-light-communication system, comprising:
a lighting fixture for visible light communication of claim 9; and
a receiver configured to receive a communication signal transmitted from the lighting fixture for visible light communication.

\* \* \* \* \*